July 17, 1962
H. R. A. HANSEN ET AL
3,045,161
MOTOR SPEED REGULATOR ARRANGEMENT
Filed May 28, 1957
3 Sheets-Sheet 1
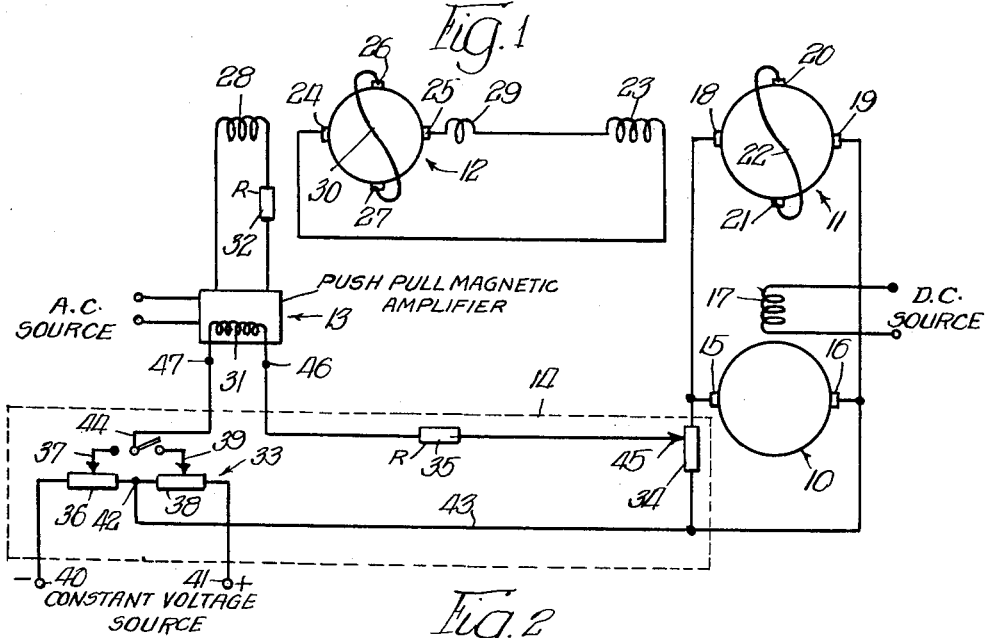
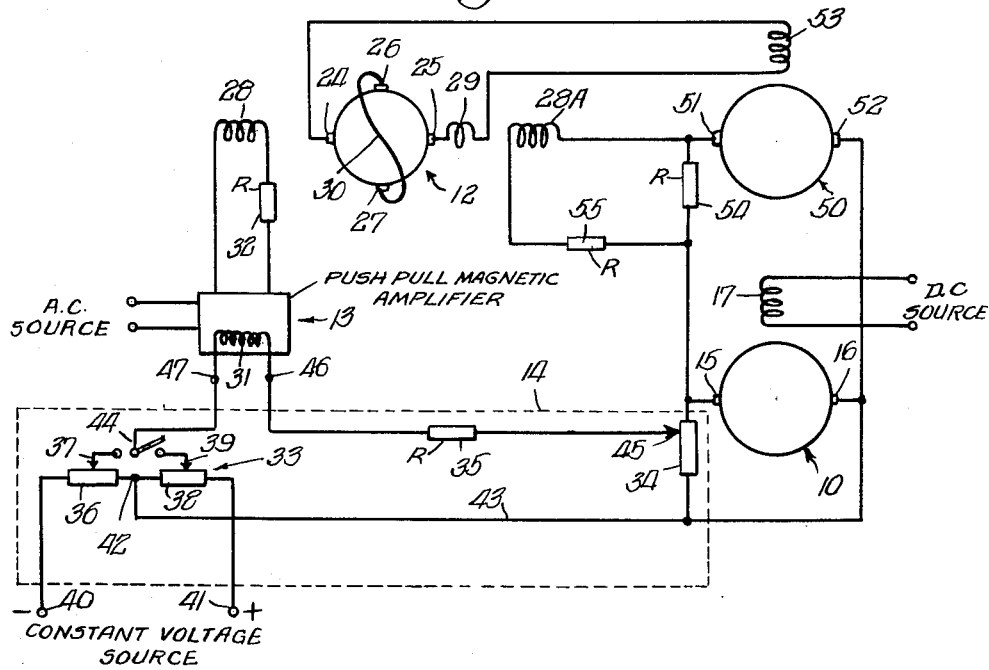
INVENTORS
Hans R. A. Hansen,
BY Horace M. Norman.
Byron, Hume, Groen & Clement
ATTYS

United States Patent Office 3,045,161
Patented July 17, 1962

3,045,161
MOTOR SPEED REGULATOR ARRANGEMENT
Hans R. A. Hansen, Milwaukee, and Horace M. Norman, West Allis, Wis., assignors to The Louis Allis Co., Milwaukee, Wis., a corporation of Wisconsin
Filed May 28, 1957, Ser. No. 662,213
4 Claims. (Cl. 318—143)

The present invention relates to a D.C. drive motor controller for reversing the drive direction of the motor and for regulating motor speed in either drive direction.

It is often desirable that a D.C. drive have characteristics including a wide speed range, constant regulation at a set speed, and fast response during starting, stopping and reversing operation. Such characteristics are particularly desirable in D.C. motors used to drive planer machines. At present, drive systems generally include a conventional D.C. motor energized from a control arrangement including a D.C. main generator, an exciter for the main generator and a control circuit for the exciter in which a voltage proportional to the motor speed is balanced against a reference voltage corresponding to the desired set speed and wherein the reference voltage is selectable for changing the set speed of the motor and for reversing the direction of the motor. One of the difficulties experienced in achieving fast response during reversal of the motor in the arrangement described above is that of commutation and that of maintaining the motor armature current high enough to establish a maximum torque in the motor. Specifically, in such an arrangement, the D.C. motor is reversed by reversing, at the generator, the voltage applied to the motor armature which causes the motor armature current controlling the motor torque to change. However, the peak armature current during reversing generally is very high, which is damaging to the commutation; at the same time the average value of the current is low causing the reversing to be slow.

An object of the present invention is to provide an improved controller for a fast response reversible drive D.C. motor which will maintain the motor speed constant under varying load conditions.

A further object of the invention is to provide an improved controller for a fast response reversible drive D.C. motor which maintains the armature current at the limit permitted for good commutation at motor speed so that maximum torque is obtained during acceleration, deceleration and reversing.

An additional object of the invention is to provide a D.C. drive motor controller employing metadyne machines for regulating motor armature current.

An additional object of the invention is to provide a controller for a fast response reversible drive D.C. motor utilizing a negative feedback voltage from the motor armature for maintaining motor speed constant and utilizing a negative current feedback from the motor armature for controlling the motor armature current to the limit permitted for good commutation.

A more specific object of the invention is to provide an improved D.C. motor controller including a magnetic amplifier responsive to weak control signals provided by a difference voltage between a reference voltage source and a motor speed-voltage source, and a current generator and generator exciter arrangement including a metadyne machine wherein the exciter is controlled from the output of the magnetic amplifier for providing exciting current to the field of the current generator.

A further object of the invention is to provide an improved D.C. motor controller, including a magnetic amplifier responsive to weak control signals provided by a difference voltage between a reference voltage source and a motor speed-voltage source, a current generator for furnishing current to the armature of the D.C. motor, and a metadyne machine utilized as a linear amplifier for the signals furnished from the magnetic amplifier and utilized as an exciter for the field of the current generator.

An additional object of the invention is to provide an improved D.C. motor controller of the type described wherein a current proportional to the motor armature current is fed back to the input of the metadyne amplifier in order to exercise a negative feedback control thereat over the generator field current and thereby establish the motor armature current at a level compatible to good motor commutation during periods of acceleration and deceleration.

An additional object of the invention is to provide an improved D.C. motor controller including a magnetic amplifier responsive in the manner as described, a metadyne generator for providing a current proportional to its field excitation current to the armature of the motor and an exciter machine operative from the output of the magnetic amplifier for amplifying the signal thereof and applying such amplified signal to the field winding of the metadyne generator.

A specific object of the invention is to provide an improved D.C. motor controller including a magnetic amplifier responsive to weak control signals provided by a difference voltage between a selective polarity voltage source and a motor speed-voltage source, a metadyne generator for providing current to the armature of the D.C. motor, and a metadyne amplifier utilized as a linear amplifier for the control signals furnished from the magnetic amplifier and utilized as an exciter for the field winding of the metadyne generator, whereby there is provided an arrangement for maintaining the motor speed constant under varying load conditions and also for maintaining motor armature current at the maximum limit for good commutation during motor starting, stopping and reversing operation in order to achieve a fast response in the motor.

Further objects and features of the invention pertain to the particular circuit components and the arrangement thereof in the improved controller whereby the above outlined and additional operating features are attained.

The structure and the mode of operation of the motor controller in accordance with the invention will be better understood by reference to the following specification and drawings wherein:

FIGURE 1 shows in schematic form a controller arrangement in accordance with the invention in which the current generator and the generator exciter are both metadyne machines;

FIG. 2 shows in schematic form a variation of the controller circuit of FIG. 1, wherein the current generator is of conventional structure and employs in its armature circuit a negative current feedback to the generator exciter;

Figure 3:
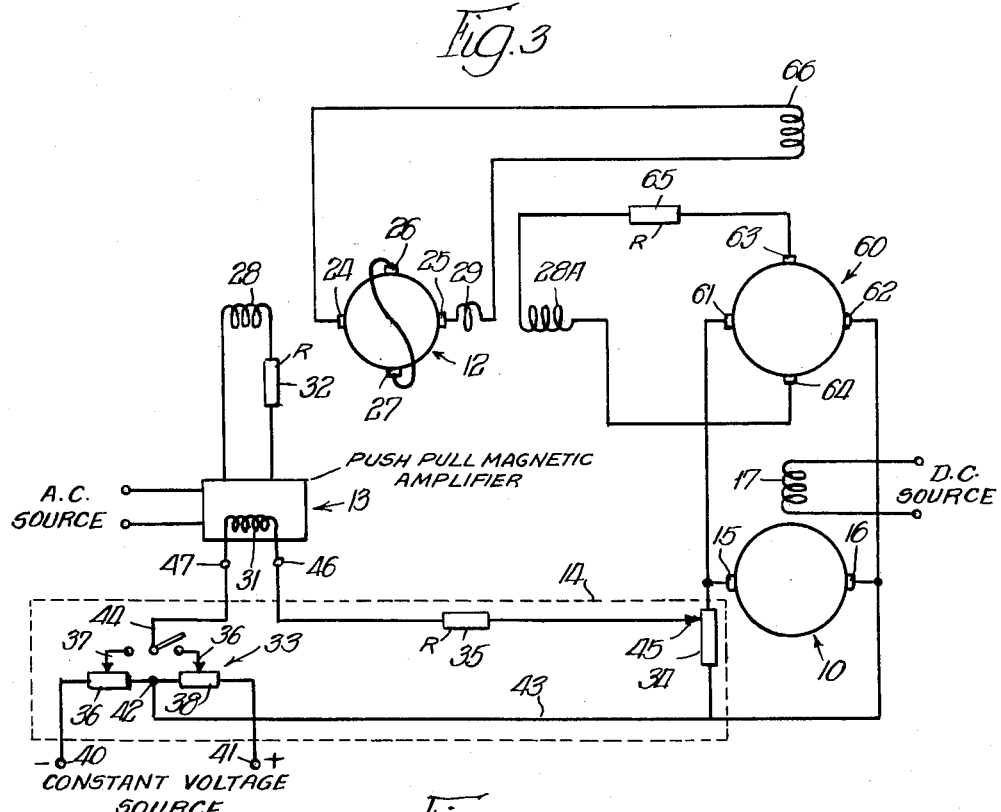
FIG. 3 shows in schematic form a variation of the controller circuit of FIG. 1 wherein the current generator is a metadyne machine adapted to provide a negative current feedback to the generator exciter.

Referring to the drawings, there is shown in FIG. 1 a D.C. drive motor arrangement in accordance with the invention including a D.C. drive motor 10, a current generator 11 for providing current to the armature of the motor 10, a metadyne amplifier stage 12 for providing current to the field winding of the generator 11, magnetic amplifier 13 providing control current to the control winding of the metadyne amplifier 12 and a motor speed and direction control circuit 14 for providing energization to the magnetic amplifier 13. The D.C. drive motor 10 is a reversible shunt motor designed for fast response and, as schematically illustrated in FIG. 1, is provided with armature brushes 15 and 16 and a field winding 17 which is energized from a constant voltage source. The generator 11, as illustrated schematically in FIG. 1, is a two pole S-generator of the metadyne type provided with four armature brushes 18, 19, 20 and 21 of which brushes 18 and 19 are arranged in an opposing pair and brushes 20 and 21 are also arranged in an opposing pair and in quadrature to the brushes 18 and 19. The brushes 18 and 19 are connected to the load, that is, to the brushes 15 and 16, respectively, of the motor 10, and the brushes 20 and 21 are shorted by a lead 22. A field winding 23 of the generator 11 is energized by current applied thereto from the metadyne amplifier 12.

The metadyne amplifier 12 is provided with armature brushes 24 and 25 arranged in an opposing pair, and armature brushes 26 and 27 arranged in an opposing pair and in quadrature to the brushes 24 and 25. The amplifier 12 is provided with a field control winding 28 and a compensating winding 29. The compensating winding 29 is connected in the load circuit across the brushes 24 and 25 of the amplifier and in series with the field winding 23 of the generator 11 and produces a field in opposition to the armature reaction caused by the current flow through the armature inductors. The brushes 26 and 27 are shorted by a lead 30 and except for the inclusion of the compensating winding 29, the structure of the metadyne amplifier is substantially identical to that of the metadyne generator 11.

Considering for a moment the nature of the metadyne it is identified as a D.C. machine with more than one brush per armature pole. In the S-generator construction utilized in the generator 11 and the amplifier 12 of FIG. 1, there is an inherent feedback between the exciting field current and the output armature current. Specifically, and referring for examplification to the generator 11, the current in the field winding 23 produces a flux which is opposed by the current flow through the armature inductors and the resultant flux induces a voltage across the brushes 20 and 21 and, accordingly, a current flow through the conductor 22. This latter current creates a flux which induces a voltage across the brushes 18 and 19 which is the output voltage of the generator. Inasmuch as the conductor 22 has a very low impedance, the flux necessary to create a substantial current through the conductor 22 is small so that the ampere turns of the exciting field current and of the output armature current will be nearly equal and the armature current will be proportional to the field current. Thus if the field current should change, the armature current will adjust itself accordingly to maintain the proportional relationship. Accordingly, the S-generator may be considered to be inclusive of a negative current feedback from the armature to the field and as a result is characterized as a fast response device.

Figure 4:
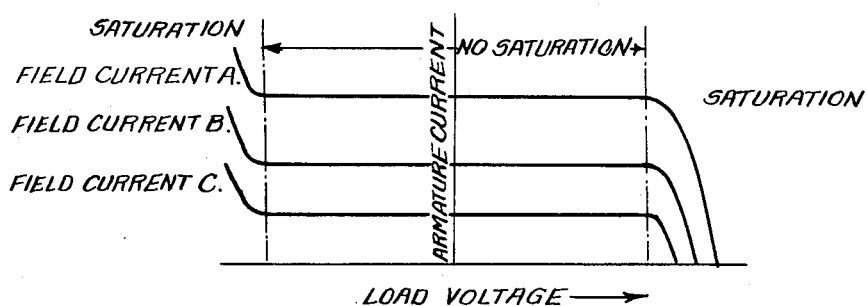
FIG. 4 shows a typical set of response curves for metadyne machines as utilized in the invention.

The metadyne amplifier 12 is different from the metadyne generator 11 only in that it includes the compensating winding 29 which opposes a large portion of the armature reaction due to the armature current. Thus, the armature current of the metadyne amplifier 12 is substantially greater than in the metadyne generator 11 for a given field current so that the effect of the compensating winding 29 is to increase the current gain of the device. FIG. 4 shows a typical set of curves for a metadyne S-generator, and as shown therein, for the condition of no saturation the armature current is substantially constant for any given field current independent of the armature load voltage.

The magnetic amplifier 13 is a conventional push-pull device powered from an A.C. source. A control winding 31 included therein is energized from the motor control circuit 14 in a manner as explained hereinafter and the output of the amplifier is applied through a series load resistor 32 to the field winding 28 of the metadyne amplifier 12.

The motor direction and speed control circuit 14 is made up of a speed potentiometer 33, a motor shunt potentiometer 34 and a load resistor 35. The speed potentiometer 33 is made up of an individual potentiometer 36 provided with a center tap 37 and an individual potentiometer 38 provided with a center tap 39 which potentiometers are connected in series across the negative and positive terminals, respectively, 40 and 41 of a constant voltage source. The junction 42 between the individual potentiometers 36 and 38 is connected by means of a conductor 43 to the armature brush 16 of the D.C. motor 10 to establish a reference potential between the D.C. motor and the speed potentiometer 33. Also provided in the speed potentiometer 33 is a double throw switch 44 for selectively completing connections to the center taps 37 and 39 of the individual potentiometers 36 and 38. The shunt motor potentiometer 34 is connected across the armature brushes 15 and 16 of the D.C. motor 10 to produce therein a voltage drop corresponding to the motor speed. The center tap 45 of the motor shunt potentiometer 34 is connected through the load resistor 35 to one terminal 46 of the control winding 31 in the magnetic amplifier 13. The other terminal 47 of the control winding 31 is connected to the center pole of the double throw switch 44. Thus, when the double throw switch 44 is closed into either of its selective positions, a circuit is completed through the speed potentiometer 33 and the shunt potentiometer 34 for energizing the control winding 31 of the magnetic amplifier 13 and in turn exciting the metadyne amplifier 12 and the metadyne generator 11 in order to drive the armature of the D.C. motor 10 in a manner as is explained hereinafter.

Assuming that the double throw switch 44 is positioned to complete a connection to the center tap 39 of the individual potentiometer 38, a circuit will be completed from the positive potential at the terminal 41 through the potentiometer 38, the center tap 39, the double throw switch 44, the control winding 31 of the push-pull amplifier 13, the load resistor 35, the shunt potentiometer 34, to reference ground potential on the conductor 43. Thus a large current is caused to flow through the control winding 31 of the magnetic amplifier 13 to energize the magnetic amplifier 13 and to cause an output voltage to be applied to the resistor 32 and the field winding 28 of the metadyne amplifier 12. The current flowing in the field winding 28 causes a voltage to be generated for the load circuit of the metadyne amplifier which includes the compensating winding 29 and the field winding 23 of the metadyne generator 11. In response to the flow of excitation current through the field winding 23, the metadyne generator produces an armature current which is applied to the armature brushes of the D.C. motor 10. Accordingly, the armature of the D.C. motor 10 is energized and begins to accelerate to the set drive speed.

Considering for a moment the manner in which the controller operates to achieve fast acceleration for the D.C. motor 10 during the starting operation 10, for good commutation the armature current thereof should not exceed a certain limit but in order to achieve a high motor torque and, accordingly, high acceleration and response the armature current during this starting interval should be maintained constant and near the maximum limit set for good commutation. In order to achieve this balance, a magnetic amplifier 13 is arranged so that, taking into consideration the amplification factor of the magnetic amplifier 13, the metadyne amplifier 12 and the metadyne generator 11, saturation is easily reached when the current flow through the control winding 31 exceeds a given value and the armature current caused to be generated in the metadyne generator 11 during magnetic amplifier saturation does not exceed the maximum limit set for good commutation. At the same time the linear response characteristics of the metadyne amplifier 12 and of the metadyne generator 11 insures that the current applied to the armature of the motor 10 from the generator 11 is substantially that maximum current permitted for good commutation. Accordingly, there is a high torque in the motor and acceleration to the set speed is rapid.

As the armature of the motor 10 begins to accelerate the voltage is developed across the armature brushes 15 and 16 thereof and accordingly across the shunt potentiometer 34. A portion of the voltage drop in the potentiometer 34 is fed back from the center tap 45 thereof to the magnetic amplifier 13 and balanced against the voltage set at the center tap 39 of the individual potentiometer 38. The difference voltage between these two center taps is applied across the series connected control winding 31 and the resistor 35 to gradually reduce the current flow through the control winding until the magnetic amplifier is no longer saturated, whereupon the output voltage of the magnetic amplifier begins to decrease. Accordingly, as the motor 10 approaches its set speed, the current applied to the armature thereof is gradually decreased to that current necessary for operating the motor at its set speed. For normal operation the required current through the control winding 31 is very low so that the voltage at the center tap 39 of the potentiometer 38 is very nearly equal to the voltage at the center tap 45 of the shunt potentiometer 34. The set motor speed is determined jointly by the setting of the center tap 39 of the potentiometer 38 and by the setting of the center tap 45 of the shunt potentiometer 34.

Regulation of the motor at the set speed is achieved in the motor speed and direction control circuit 14. Changes in the motor speed are of course reflected by changes in the motor armature voltage across the potentiometer 34 which is in turn reflected by a change in the voltage at the center tap 45 thereof and by a resultant change in the control current through the control winding 31 of the magnetic amplifier 13. The polarities of the voltages in the system are arranged so that a change in the control current to the magnetic amplifier 13 causes a corresponding change in the output current of the metadyne generator 12 which tends to bring the motor speed back to its original value and, accordingly, the motor armature voltage to its original value. Thus accurate speed control is maintained until such time as the motor is stopped or the motor is reversed by, for example, disconnecting the double throw switch 44 from the center tap 39 of the individual potentiometer 38 and connecting it to the center tap 37 of the individual potentiometer 36, as considered hereinafter.

Assuming now that the motor 10 is in operation at its set speed and in one rotational direction by the double throw switch 44 being closed to complete a connection to the center tap 39 of the potentiometer 38, and assuming further that this connection is interrupted to complete a new connection to the center tap 37 of the potentiometer 36, the heretofore small potential difference between the center tap 45 and the shunt potentiometer 34, which was of a given polarity, suddenly becomes a large potential difference of a reversed polarity. This results in a large reverse current through the control winding 31 of the magnetic amplifier 13 which produces within the limits of saturation a large reverse output voltage from the magnetic amplifier to the field winding 28 of the metadyne amplifier 12. In the metadyne amplifier, the reverse voltage applied to the field winding 28 thereof causes a reversal of the current flow therethrough, which produces an immediate reversal in the current applied therefrom to the field winding 23 of the metadyne generator 11. In the metadyne generator 11, the reversal of the curent in the field winding 23 thereof causes an immediate reversal in the current applied to the armature of the motor 10. Due to the negative feedback characteristics of the metadyne generator 11 and of the metadyne amplifier 12, as explained heretofore, the reversal of the motor armature current is immediate and is maximum within the limits set for good motor commutation so as to exercise a large braking torque on the motor 10. Accordingly, the motor is rapidly decelerated, stopped, and accelerated in the reverse direction to the set reverse speed. As the motor accelerates towards the set reverse speed, the voltage across the shunt potentiometer 34 and, accordingly, the voltage at the center tap 45 thereof gradually changes towards that voltage established at the center tap 37 of the potentiometer 36. When the armature of the motor 10 reaches the set reverse speed, the voltage at the center tap 45 is very nearly equal to the voltage at the center tap 37 so that the current flow through the control winding 31 of the magnetic amplifier 13 is reduced substantially and is sufficient only to maintain the motor speed at the reverse setting. Regulation of the motor speed at the reverse setting is as described heretofore. Accordingly, through use of the control arrangement in accordance with the invention starting, stopping, and reversal of the motor is carried out rapidly and during operation the motor is closely regulated at the set speed.

An alternate motor controller arrangement in accordance with the invention is shown in FIG. 2. There is included therein the D.C. motor 10, a motor generator 50, the metadyne amplifier 12, the magnetic amplifier 13, the motor speed and direction control circuit 14. The D.C. motor 10, the magnetic amplifier 13, and the motor speed and direction control circuit 14 are identical to the respectively corresponding units employed in the arrangement of FIG. 1. The metadyne amplifier 12, is modified from that shown in FIG. 1 only insofar as there is included therein an additional control winding 28A which is utilized in a manner as explained hereinafter. The motor generator 50 is a conventional D.C. machine, provided with one brush per armature pole and as illustrated schematically includes the armature brushes 51 and 52. A field winding 53 for the motor generator 50 is connected in the output circuit of the metadyne amplifier 12 and in series with the compensating winding 29 thereof in the same manner as is the field winding 23 of FIG. 1.

The armature current of the motor generator 50 does not bear the same proportional relationship to the field current thereof as in the metadyne generator 11 of FIG. 1. In order for the armature current in the motor generator 50 to bear a proportional relationship to the field current for purposes of rapidly reversing motor direction, there is provided in the arrangement of FIG. 2 an armature current feedback circuit extending to the input of the metadyne amplifier 12. This arrangement includes a load resistor 54 connected in series between the generator armature brush 51 and the motor armature brush 15 and a parallel connected circuit including the control winding 28A of the metadyne amplifier 12 and a series resistor 55. The control winding 28A is arranged so that under normal operating conditions its field is in adding relationship to that of the compensating winding 29 and in opposing relationship to that of the control winding 28. Accordingly, when the direction of the current applied to the field winding 53 is reversed, the negative feedback current from the armature of the generator 50 contributes to the current change and increases the response of the control arrangement. Specifically, when the double throw switch 44 in the control circuit 13 is operated to interrupt the connection to the center tap to one of the individual potentiometers 36 and 38 and to complete a connection to the other of the center taps, the current in the field winding 28 of the metadyne amplifier 12 is reversed. In this instance the field due to the control winding 28 and the field due to the control winding 28A are in adding relationship because the armature current of the generator 50 has not been changed. Accordingly, the current in the field winding 53 of the generator 50 is reversed from its normal direction of flow and due to the effect of the negative current feedback from the armature thereof, this field current is substantial. The armature current of the generator 50 is reversed rapidly and as it changes in magnitude and direction of flow the current to the field winding 53 is gradually diminished until the motor reaches its set reverse speed. Thus, the negative current feedback arrangement contributes to the rapidity of the change in the armature current of the generator 50 and renders the generator a high response device.

Though the negative current feedback arrangement for the generator 50 is shown in FIG. 2 to be a shunt arrangement, it is understood that the control winding 28A of the metadyne amplifier 12 could be connected directly in series with the armature brush 51 of the generator 50 and the armature brush 15 of the motor 10 in order to utilize the full armature current for negative feedback purposes.

Another motor controller arrangement in accordance with the invention is shown in FIG. 3. There is shown in FIG. 3 the D.C. motor 10, a metadyne generator 60, the metadyne amplifier 12, the magnetic amplifier 13, and the motor speed and direction control circuit 14. The D.C. motor 10, the magnetic amplifier 13, and the speed and direction control circuit 14 are identical to the respectively corresponding units employed in the arrangements of FIGS. 1 and 2. The metadyne amplifier arrangement 12 in FIG. 3 is substantially identical to that arrangement employed in FIG. 2 and includes the control winding 28A. The metadyne generator 60 is similar to the metadyne generator 11 employed in FIG. 1 in that it employs more than one brush per armature pole and includes, as shown schematically in FIG. 3, armature brushes 61 and 62 which are arranged in an output pair and armature brushes 63 and 64 which are arranged in a pair in quadrature to the brushes 61 and 62 for providing a negative current feedback to the control winding 28A of the metadyne amplifier 12 through a series connected resistor 65. The negative current feedback arrangement of FIG. 3 functions in the same manner as the negative current feedback arrangement of FIG. 2. However, the current feedback in this instance is not taken directly from the output brushes 61 and 62 of the generator but from the satellite brushes 63 and 64. The voltage across these brushes is induced by the armature reaction flux created by the generator armature current. This voltage produces a corresponding current flow through the control winding 28A and the series connected resistor 65 which is proportional to the output current of the generator. Accordingly, there is provided in the arrangement of FIG. 3 a negative current feedback that is effective in the same manner as the negative current feedback arrangement of FIG. 2 rendering the metadyne generator 60 a high response device.

Figure 5:
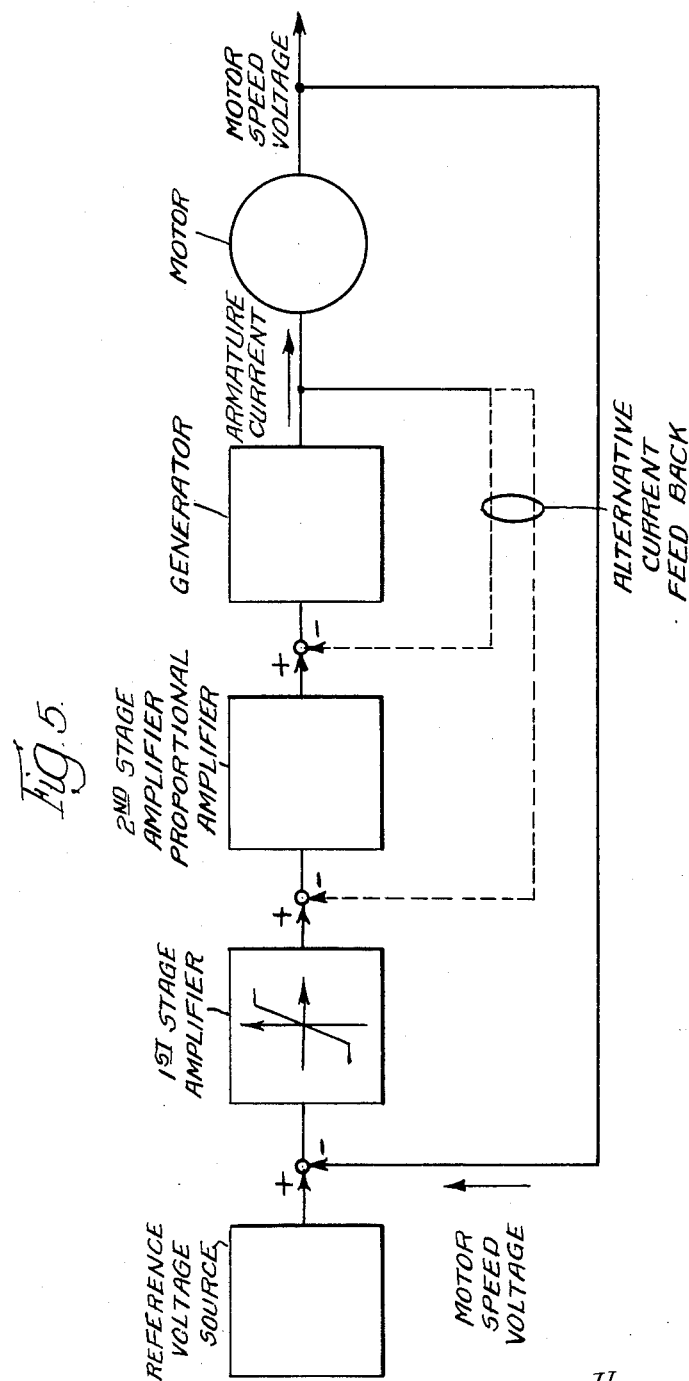
FIG. 5 shows in block schematic form the principle of the arrangements set forth in FIGS. 1, 2 and 3.

From the foregoing it is understood that the principle for the drives is as illustrated in FIG. 5. All the described drives consists of reference, first stage push-pull amplifier with pronounced ceiling limit due to saturation, second stage proportional amplifier, main generator and motor. A current feedback either inherent to the main generator or provided to the input of the second stage amplifier forces the armature current to be proportional to the output signal from the first stage amplifier and limits the armature current to a value determined by the saturation in this amplifier. A speed feedback voltage to the input of the first stage amplifier forces the speed to follow the reference as long as the armature current is less than the value determined by the maximum output from the first stage amplifier.

From the foregoing, it is clear that there has been provided a new and improved D.C. motor controller arrangement with high response characteristics which is controllable for rapidly accelerating the D.C. motor from start, decelerating the motor and reversing motor drive direction, and which regulates motor speed substantially constant at any set drive speed.

While the above described arrangements are at present considered to be preferred, it is understood that modifications may be made therein, and it is intended to cover in the appended claims all such modifications and variations as fall within the true spirit and scope of the invention.

What is claimed is:

1. A speed regulator system for an armature controlled D.C. motor comprising a non-saturated metadyne generator providing current from its armature to the armature of said motor wherein said armature current provides a negative feedback component to the excitation field of said generator so that the armature current is maintained substantially proportional to the generator field current, a reference voltage source, a voltage source responsive to motor speed, a highgain generator controller including a magnetic amplifier input stage and a metadyne amplifier output stage for providing field current to said generator, and differential connections between said reference voltage source and said motor speed-voltage source through the control winding of said magnetic amplifier for energizing said controller with the potential difference therebetween, whereby the field current to said generator controlling the armature energization of said motor is determined initially by said reference voltage source and the saturation of said magnetic amplifier and is regulated thereafter in accordance with the voltage of said motor speed-voltage source.

2. A speed regulator system for an armature controlled D.C. motor comprising a non-saturated metadyne generator providing current from its armature to the armature of said motor wherein said armature current provides a negative feedback component to the excitation field of said generator so that the armature current is maintained substantially proportional to the generator field current, a voltage source having a high voltage terminal and a low voltage terminal and an intermediate voltage terminal, a voltage divider connected across the armature brushes of said motor, a highgain generator controller including a magnetic amplifier input stage and a metadyne amplifier output stage for providing field current to said generator, a first connection from said intermediate voltage terminal to one armature brush of said motor, and a second connection from the center tap of said voltage divider through the control winding of said magnetic amplifier completed selectively to said high voltage terminal and to said low voltage terminal for energizing said controller in order to control the magnitude and direction of the field current provided to said generator, whereby responsive to the completion of said second connection to one of said high and low voltage terminals the armature of said motor is accelerated in the corresponding rotational direction to a set speed at a rate limited by the saturation of said magnetic amplifier.

3. A speed regulator system for an armature controlled D.C. motor comprising a non-saturated metadyne generator providing current from its armature to the armature of said motor wherein said armature current provides a negative feedback component to the excitation field of said generator so that the armature current is maintained substantially proportional to the generator field current, a voltage source having a high voltage terminal and a low voltage terminal and an intermediate voltage terminal, a potentiometer connected across the armature brushes of said motor, a highgain generator controller including a magnetic amplifier input stage and a metadyne amplifier output stage for providing field current to said generator directly proportional to the output of said magnetic amplifier, a first connection from said intermediate voltage terminal to one armature brush of said motor, an impedance device, and a second connection from the center tap of said potentiometer through said impedance device and the control winding of said magnetic amplifier completed selectively to said high voltage terminal and to said low voltage terminal for energizing said magnetic amplifier in accordance with the magnitude and direction of current flow between said center tap and the connected one of said terminals thereby to control respectively the magnitude and direction of the field current to said generator, whereby responsive to the completion of said second connection to either one of said high and low voltage terminals the armature of said motor is accelerated in the corresponding rotational direction to a set speed at a rate limited by saturation in said magnetic amplifier and regulated by the potential across said control winding and said impedance device.

4. A speed regulator system for an armature controlled D.C. motor comprising a field excited generator providing armature current to said motor, a reference source, a high gain generator controller controlled from said reference source for producing field excitation current in said generator and including a series connected magnetic amplifier input stage and a metadyne amplifier output stage, negative voltage feedback means from the armature of said motor for controlling in accordance with the voltage across the armature thereof the further energization of said controller thereby to control the field excitation current in said generator, and negative current feedback means from the armature of said motor for controlling in accordance with the current flow through the armature thereof the field excitation current in said generator, whereby the armature current to said motor is controlled in accordance with the power load thereof, wherein said field excited generator is a non-saturated metadyne machine and wherein said negative current feedback means is included in said metadyne generator.

References Cited in the file of this patent

UNITED STATES PATENTS

| | | |
|---|---|---|
| 2,311,462 | Neal | Feb. 16, 1943 |
| 2,629,847 | Eames et al. | Feb. 24, 1953 |
| 2,785,360 | Abell et al. | Mar. 12, 1957 |
| 2,821,672 | Sichling et al. | Jan. 28, 1958 |

FOREIGN PATENTS

| | | |
|---|---|---|
| 152,971 | Australia | Aug. 27, 1953 |
| 617,056 | Great Britain | Feb. 1, 1949 |
| 706,414 | Great Britain | Mar. 31, 1954 |
| 709,835 | Great Britain | June 2, 1954 |